(12) United States Patent
Cass et al.

(10) Patent No.: US 11,878,792 B2
(45) Date of Patent: Jan. 23, 2024

(54) STIFFENED COMPOSITE PANEL WITH INTEGRATED SHIM

(71) Applicant: The Boeing Company, Chicago, IL (US)

(72) Inventors: Gregory A. Cass, Seattle, WA (US); Ian E. Schroeder, Seattle, WA (US); Khanh M. Pham, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/522,759

(22) Filed: Nov. 9, 2021

(65) Prior Publication Data

US 2022/0169364 A1 Jun. 2, 2022

Related U.S. Application Data

(60) Provisional application No. 63/119,885, filed on Dec. 1, 2020.

(51) Int. Cl.
*B64C 3/18* (2006.01)
*B32B 3/08* (2006.01)
(Continued)

(52) U.S. Cl.
CPC .......... *B64C 3/182* (2013.01); *B29C 66/0326* (2013.01); *B32B 3/085* (2013.01);
(Continued)

(58) Field of Classification Search
CPC ........ B29C 66/0326; B32B 2038/0076; B32B 2260/023; B32B 2260/046;
(Continued)

(56) References Cited

U.S. PATENT DOCUMENTS

| 9,010,689 B1 * | 4/2015 | Brook | B64D 37/32 |
| | | | 244/135 R |
| 2019/0193371 A1 * | 6/2019 | Shinozaki | B32B 5/10 |

(Continued)

FOREIGN PATENT DOCUMENTS

| AU | 2019200984 A1 * | 8/2019 | ........... B29C 70/342 |
| CN | 111324940 A | 6/2020 | |

(Continued)

OTHER PUBLICATIONS

English translation of EP2336021.*

(Continued)

*Primary Examiner* — Sonya M Sengupta
(74) *Attorney, Agent, or Firm* — Kwan & Olynick LLP

(57) ABSTRACT

Provided are stiffened stringer panels with integrated shim structures. An example composite panel comprises a skin member having an inner surface, and a stringer positioned on the inner surface. The stringer comprises a first flange portion and a second flange portion with the first flange portion and the second flange portion contacting the inner surface. The composite panel further comprises an integrated shim positioned on the first flange portion. The integrated shim may comprise a sacrificial material configured to be trimmed to the desired geometry. The sacrificial material may comprise a glass fiber reinforced plastic fabric pre-impregnated with resin. The integrated shim may be configured to interface with internal support structures of a wing assembly. The integrated shim may be configured to be machined to fit dimensions and measurements corresponding to the internal support structures of the wing assembly.

9 Claims, 12 Drawing Sheets

(51) Int. Cl.
  *B32B 5/26* (2006.01)
  *B32B 5/10* (2006.01)
  *B29C 65/00* (2006.01)
  *B32B 38/00* (2006.01)
  *B32B 3/10* (2006.01)
  *B32B 38/10* (2006.01)

(52) U.S. Cl.
  CPC .................. *B32B 5/10* (2013.01); *B32B 5/26* (2013.01); *B32B 38/0004* (2013.01); *B32B 38/10* (2013.01); *B32B 2038/0076* (2013.01); *B32B 2260/023* (2013.01); *B32B 2605/18* (2013.01)

(58) Field of Classification Search
  CPC ........ B32B 2262/101; B32B 2262/106; B32B 2605/18; B32B 3/085; B32B 3/263; B32B 38/0004; B32B 38/10; B32B 5/02; B32B 5/10; B32B 5/26; B32B 7/05; B64C 1/064; B64C 2001/0072; B64C 3/182; B64C 1/12; B64C 3/26; B64F 5/10
  See application file for complete search history.

(56) References Cited

U.S. PATENT DOCUMENTS

2020/0192331 A1  6/2020  Engelbart et al.
2021/0086886 A1* 3/2021  Behzadpour ............ B29C 70/30

FOREIGN PATENT DOCUMENTS

EP    3173224 A1 *  5/2017  ........... B29C 65/488
EP    3666508 A1    6/2020

OTHER PUBLICATIONS

English translation of EP3173224.*
English translation of EP2730498.*
English translation of WO2015/082826.*
English translation of WO2009/044362.*
Kamila, Eric Sean et al., "Composite Spars with Integrated Sacrificial Surfaces", U.S. Appl. No. 17/465,636, filed Sep. 2, 2021.
Kamila, Eric Sean et al., "Composite Spars with Integrated Sacrificial Surfaces", U.S. Appl. No. 17/510,378, filed Oct. 26, 2021.

* cited by examiner

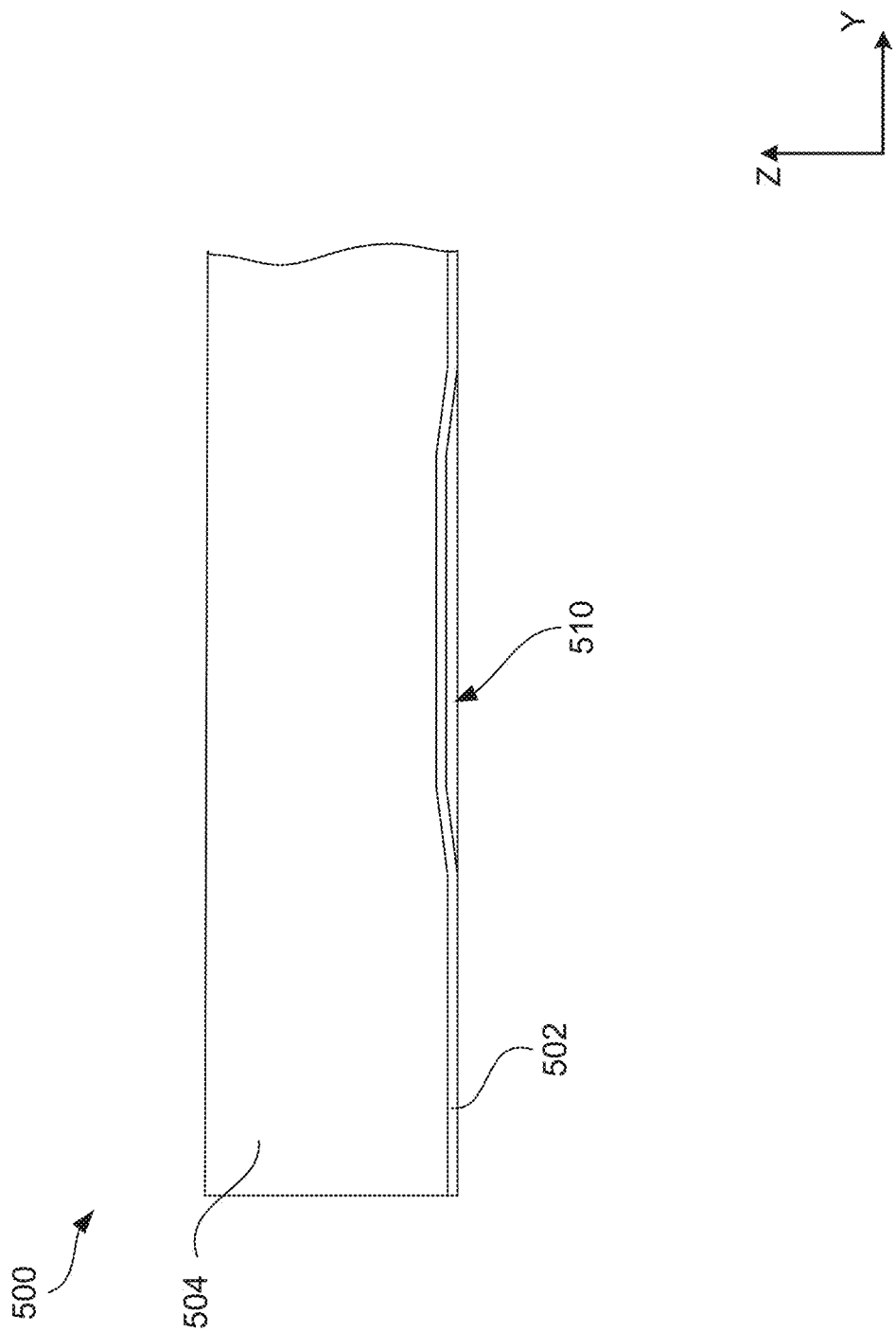

STIFFENED COMPOSITE PANEL WITH INTEGRATED SHIM

CROSS-REFERENCE TO RELATED APPLICATIONS

This application claims the benefit under 35 U.S.C. § 1.19(e) of U.S. Provisional Patent Application No. 63/119,885, filed on Dec. 12, 2001, which is incorporated herein by reference in its entirety for all purposes.

TECHNICAL HELD

The present disclosure relates generally to aircraft support structures and, more specifically, to stringer panels.

BACKGROUND

In aircraft and launch vehicle construction, various surfaces, such as the skin of an aircraft, may be attached to internal structures. In a typical aircraft fuselage, the fuselage skin includes stringers that run in the longitudinal direction of the aircraft. They are primarily responsible for transferring the aerodynamic loads acting on the skin onto internal structures including frames. In the wings or horizontal stabilizer of an aircraft, stringers attach to the wing/horizontal stabilizer skin and their primary function here is to transfer the bending loads acting on the wings onto internal structures such as ribs and spars.

The assembly of aircraft requires the precise fitting of panels to the internal structures and non-uniform gaps must be accurately measured to create and install custom shims for appropriate installation which is labor and time-intensive and can cause delays during the assembly process.

Thus there exists a need for improved systems and methods for manufacturing aircraft support structures that reduce manufacturing challenges, including increased labor, extensive tooling, factory space, and material handling equipment.

SUMMARY

The following presents a simplified summary of the disclosure to provide a basic understanding of certain examples of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are stiffened composite panels for various aircraft structures and methods of fabricating such panels. Specifically, a composite panel comprises a skin member having an inner surface, and a stringer positioned on the inner surface. The stringer comprises a first flange portion and a second flange portion with the first flange portion and the second flange portion contacting the inner surface. The composite panel further comprises an integrated shim positioned on the first flange portion.

The integrated shim may comprise a sacrificial material configured to be trimmed to the desired geometry. The sacrificial material may comprise a glass fiber reinforced plastic fabric pre-impregnated with resin. The integrated shim may comprise a plurality of laminated layers of the glass fiber reinforced plastic fabric. The composite fibers of adjacent laminate layers may include the same orientation angle.

The integrated shim may be configured to interface with internal support structures of a wing assembly. The integrated shim may be configured to be trimmed to fit dimensions and measurements corresponding to the internal support structures of the wing assembly.

The stringer may be a blade stringer comprising a central blade structure extending into the first flange portion and the second flange portion from a base of the central structure. The integrated shim, the stringer, and the skin member may be co-cured. The integrated shim, the stringer, and the skin member may be co-bonded.

Other implementations of this disclosure include systems and methods corresponding to the described apparatus. For instance, in another aspect, which may include at least a portion of the subject matter of any of the preceding and/or following examples and aspects, an aircraft is provided which comprises one or more composite panels as described above.

Also provided is a method of manufacturing the described composite panels. The method comprises providing a skin member having an inner surface, and positioning a stringer onto the inner surface of the skin member. The stringer comprises a first flange portion and a second flange portion with the first flange portion and the second flange portion contacting the inner surface. The method further comprises positioning an integrated shim on the first flange portion, and joining the integrated shim, the stringer, and the skin member.

The method may further comprise trimming the integrated shim to fit dimensions and measurements corresponding to an internal support structure of a wing assembly and installing the stiffened composite panel to the wing assembly such that the integrated shim interfaces with the internal support structure.

These and other examples are described further below with reference to the figures.

BRIEF DESCRIPTION OF THE DRAWINGS

FIG. 5 illustrates an example caul structure for supporting an integrated shim in accordance with one or more examples.

DETAILED DESCRIPTION

Figure 1A:
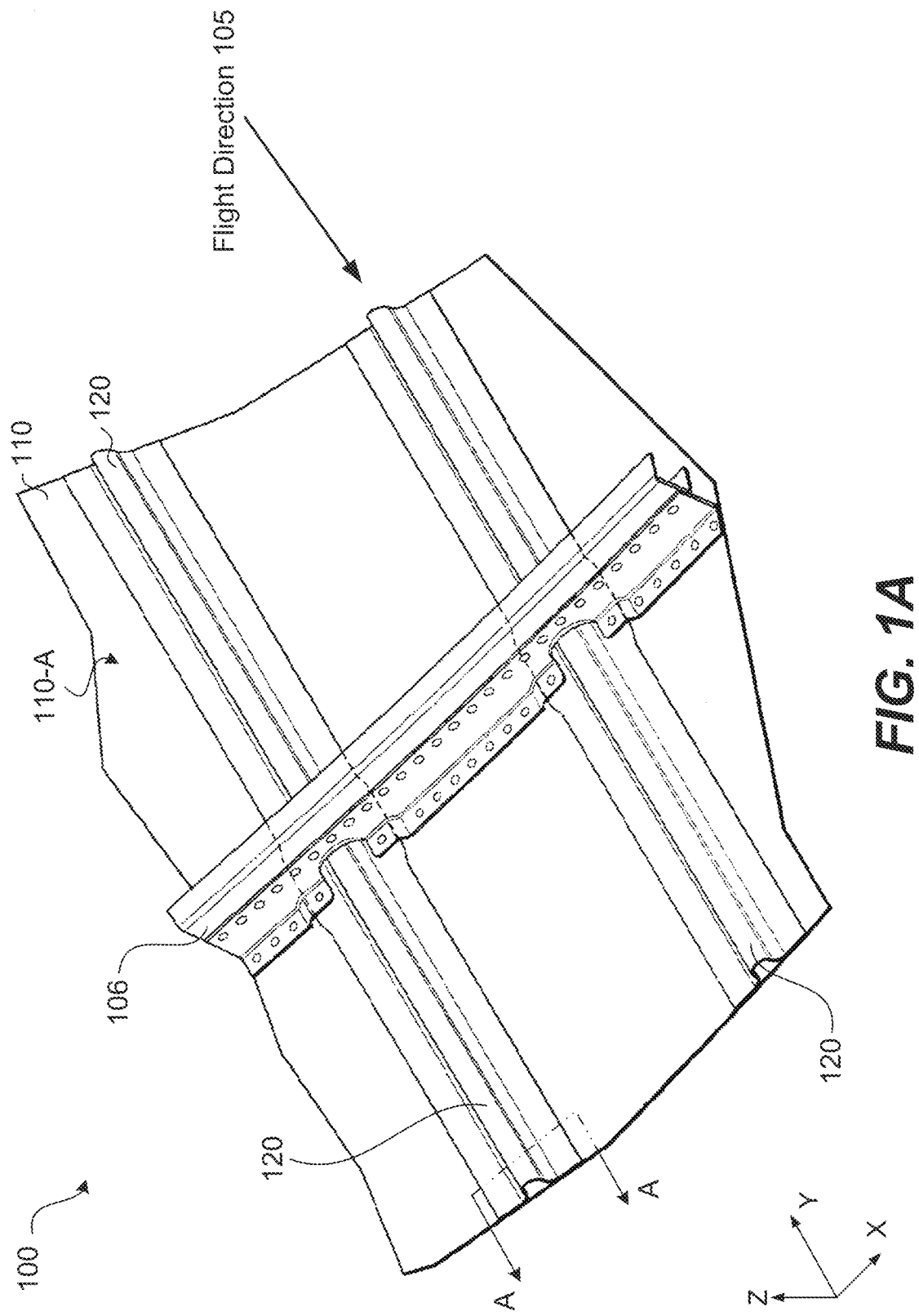
FIG. 1A illustrates an example of a stiffened stringer panel that may be implemented with various examples of the present disclosure.

In the following description, numerous specific details are set forth in order to provide a thorough understanding of the presented concepts. The presented concepts may be practiced without some or all of these specific details. In other instances, well-known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as skin panels. However, it should be noted that the techniques and mechanisms of the present disclosure may apply to various other panel assemblies of various other vehicles or building structures. In the following description, numerous specific details are set forth in order to provide a thorough understanding of the present disclosure. Particular examples of the present disclosure may be implemented without some or all of these specific details. In other instances, well-known process operations have not been described in detail in order not to unnecessarily obscure the present disclosure. Various techniques and mechanisms of the present disclosure will sometimes be described in singular form for clarity. However, it should be noted that some examples include multiple iterations of a technique or multiple instantiations of a mechanism unless noted otherwise.

Overview

The present disclosure describes novel stiffened stringer panel assemblies for aircraft and other vehicles or industrial systems. The stiffened stringer panels described herein include an integrated shim structure positioned on a stringer or other part of the panel. The integrated shim may comprise a sacrificial material that may be machined to precisely fit the geometry of the interface between the panel and internal support structures, such as in a wing box assembly. A specially configured support tool, such as a caul, may be implemented during the curing or bonding process to stabilize the stringer and integrated shim.

Existing assembly processes implement designed in gaps between the panel and internal support structures to account for possible distortions in the panel caused during the curing or bonding process, as well as by human error. Gaps are then manually measured by a technician which may occur in the closed and restricted space of a wing box and may result in additional human error. The measurements are then taken from the assembly area to an off-site shim shop to custom machine a shim to the measurements. After the shim is machined, it is taken back to the assembly area to be installed in the restricted space. This can cause delays of up to 24 hours or more during the assembly process.

The integrated shim structure that is built-in to the panel eliminates the need for custom machining of separate shim pieces. Instead, the integrated shim provides sacrificial material that may be trimmed or shaped after curing and before transport to the assembly area for installation of the panel. This significantly reduces labor and assembly time. The use of the integrated shim at the assembly area also reduces or eliminates assembly variability from part to part, producing repeatable high-quality results. For example, the geometry of the integrated shims on the stiffened panel may be measured and trimmed using a numerical control mill fixture. This allows for precise fitting before the panel is installed onto various structures and work can be done in open environments. Therefore, the systems and assemblies described provide improvements over existing systems of panel assembly which will be further described herein.

Example Embodiments

An example of a stiffened stringer panel 100 that may be implemented with various examples of the present disclosure is described with reference to FIG. 1A. As depicted in FIG. 1A, panel 100 is defined by a lateral axis (X-axis), a longitudinal axis (Y-axis), and a vertical axis (Z-axis). In some examples, panel 100 may be a portion of the hull of an aircraft fuselage. However, in other examples, panel 100 may be a portion of various other structures. For example, various panels may comprise portions of a skin panel, wing structure, or structures in horizontal and vertical stabilizers or control surfaces.

As shown in FIG. 1A, panel 100 comprises an outer skin member 110 with an inner surface 110-A. In various examples, the structure of panel 100 may include a frame 106. Panel 100 may be reinforced with one or more stiffened support structures, such as stringers 120, coupled to panel 100 along the inner surface 110-A. In some examples, stringers 120 may be configured such that the lengths of stringers 120 are oriented to be substantially parallel to the direction of flight 105, which is parallel to the Y-axis, as shown in FIG. 1. However, in various examples, stiffened support structures may be oriented at various other angles and orientations based on load paths and deflection direction in order to reduce loads and deflection of the main structure. In addition, stiffened support structures may include other orientations driven by other functionalities, such as locations needed for bracket attachments of wiring or venting gas through the stringer.

Although stringers 120 are shown as hat stringers, the stringers 120 on a panel may be configured with various cross-sectional shapes for different structural properties, Various stringer types may include closed cross-sectional shapes such as hat-shape stringers, or open cross-sectional shapes, such as Z-shape, i-shape, I-shape, L-shape, or T-shape (blade) stringers. Other formed stringer types may include blade stringers, Z-shape stringers, C-shape stringers, etc.

Figure 1B:
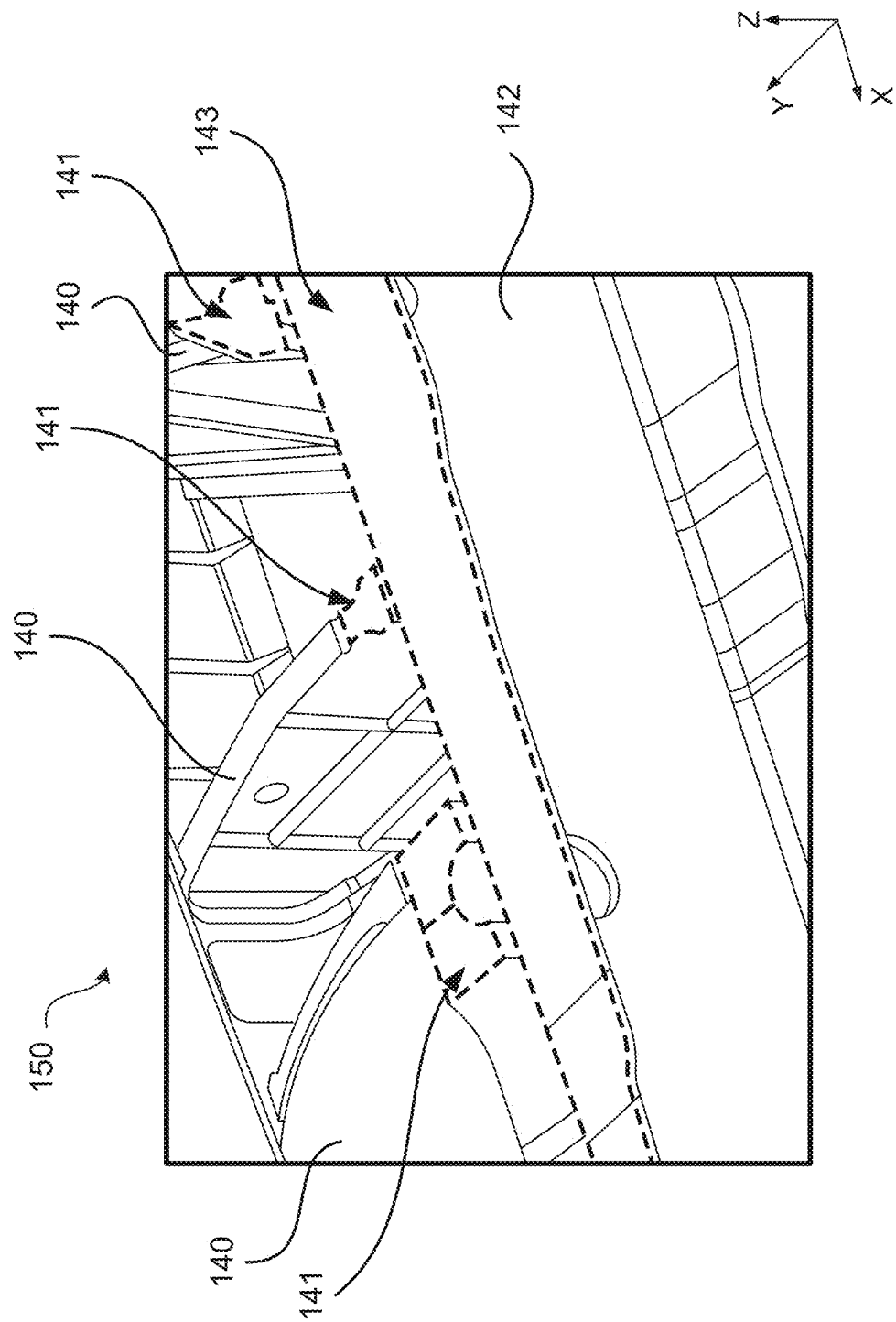
FIG. 1B illustrates an interior environment of an example wing assemblies that may be implemented with various examples of the present disclosure.

FIG. 1B illustrates an interior environment of a wing assembly 150 that includes support structures positioned between stiffened panels. As shown, the interior environment includes various interface surfaces upon which stiffened panels, as described herein, must fit precisely. The interior environment of wing assembly 150 may include various internal support structures, including rib 140 and spar 142. These support structures include surfaces (outlined in dashed lines) that may interface with various portions of a stiffened panel. These interface surfaces include interface surfaces 141 of ribs 140 which may interface with a stringer, and interface surface 143 of spar 142 which may interface with other portions of the stiffened panel. Since each stiffened panel may include unique variances due to the assembly process, the shape of a given panel is measured to determine the size of gaps between the panel structures and the interface surfaces of the internal support structures.

Figure 1C:
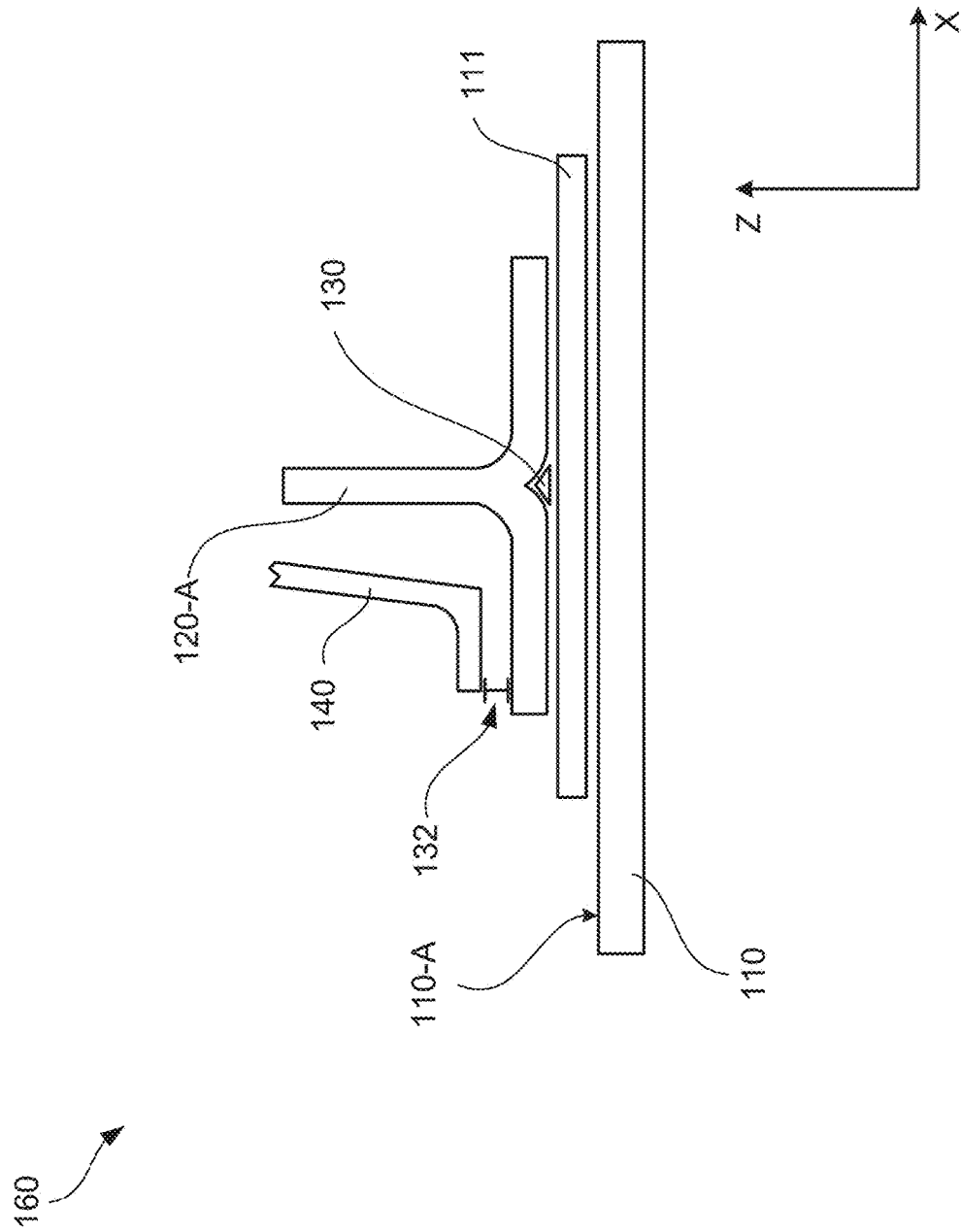
FIG. 1C illustrates a cross-sectional view of an example of existing stringer panel assembly systems.

FIG. 1C illustrates a cross-sectional view of an example of an existing stringer panel assembly system 160. In some examples, system 160 may comprise panel 100 and FIG. 1C depicts a cross-section of a portion of the panel from the A-A viewpoint (identified in FIG. 1A) corresponding to the longitudinal axis.

As shown, existing panel assembly system 160 comprises a skin member 110 with a T-shaped, or blade, stringer 120-A along the inner surface 110-A. Stringer 120-A may comprise a central structure extending into two flange portions from the base of the central structure. The stringer may comprise one or more stringer plies or layers and may be prefabricated before being placed onto the skin member. In some examples, stringer 120-A may be positioned on a base charge 111 if needed for structural and assembly quality purposes. However, in other examples, stringer 120-A may be directly placed on skin member 110. The skin member and stringers may comprise various layers or plies of pre-impregnated composite materials (or "pre-preg"), such as carbon fiber reinforced plastic (CFRP) or glass fiber reinforced plastic (GFRP).

In various examples, the assembly of panels may require support tools to provide structural or positional support for stringers as they are cured or otherwise set into place. For example, support tool 130 may be a radius filler, or noodle, which may function to fill in gaps between the stringer 120-A and base charge 111 or skin member 110 to provide structural support and prevent resin pooling during curing. In some examples, depending on the configuration of the stringer, support tooling may include mandrels which may be any one of various types of mandrels, such as solid rubber mandrels, expanding rubber mandrels, washout mandrels formed of clay or powder, and flyaway foam mandrels. In other examples, a support tool may be an inflatable bladder type.

In stringer panel assemblies, such support tooling must be precisely aligned on the skin member or base charge in order to accurately control the stringer location, as well as the positioning and shape of the stringer. In existing panel assemblies, placement and/or alignment of support tools and/or stringers is most often done with large tool aids to lift, transport, and place the support tools. Accurate placement may be additionally achieved by various methods including the use of optical laser templates to guide manual placement within borders defined by lasers. Various other alignment mechanisms may be implemented to guide the manual placement of the support tool. Efforts to ensure accurate manual alignment of support tools may further result in increased labor requirements and longer build times.

Portions of the stringer panel, such as stringer 120-A, may be configured to interface with support structures, such as rib 140, during the build process. However, shimming of composite blade stiffened panel is typically required because of detail fabrication and subassembly tolerance stickups (hardware variability), tooling tolerances, complex contoured geometry, and engineering requirements. For example, gap 132 may exist between the interface surface 141 of rib 140 and the surface of stringer 120-A, and will need to be filled for appropriate assembly. Such gaps may be present due to distortions caused during the curing or bonding process. Gaps may also be designed in so that precise fitting may be performed during assembly.

Typically, an assembly mechanic will take measurements of the local gap (132), machine a shim to the correct local geometry, and install the shim to fill the gap. This may require additional measurement of the surface geometry of the interface surface 141 of rib 140 and the surface of blade stringer 120-A in order to create a shim to fit at the base of the rib between the rib and the blade stringer.

Currently, systems require shims to take-up or fill a gap that occurs between structural members during assembly fit-up. To do this, assembly mechanics take measurements of the local gap (132) using a gapman device. The assembly mechanic then separately machines a shim to the correct local geometry based on the measurements with complex shim shop equipment such as a 5-axis machine. In some instances, a complex multi-piece shim is required to fill the gap between interface surfaces. The shim or multiple shims are then transported back to the assembly area for installation onto the interface surfaces to fill the gap. This existing process drives large amounts of flow into the manufacturing process and does not enable repeatable quality.

Figure 2:
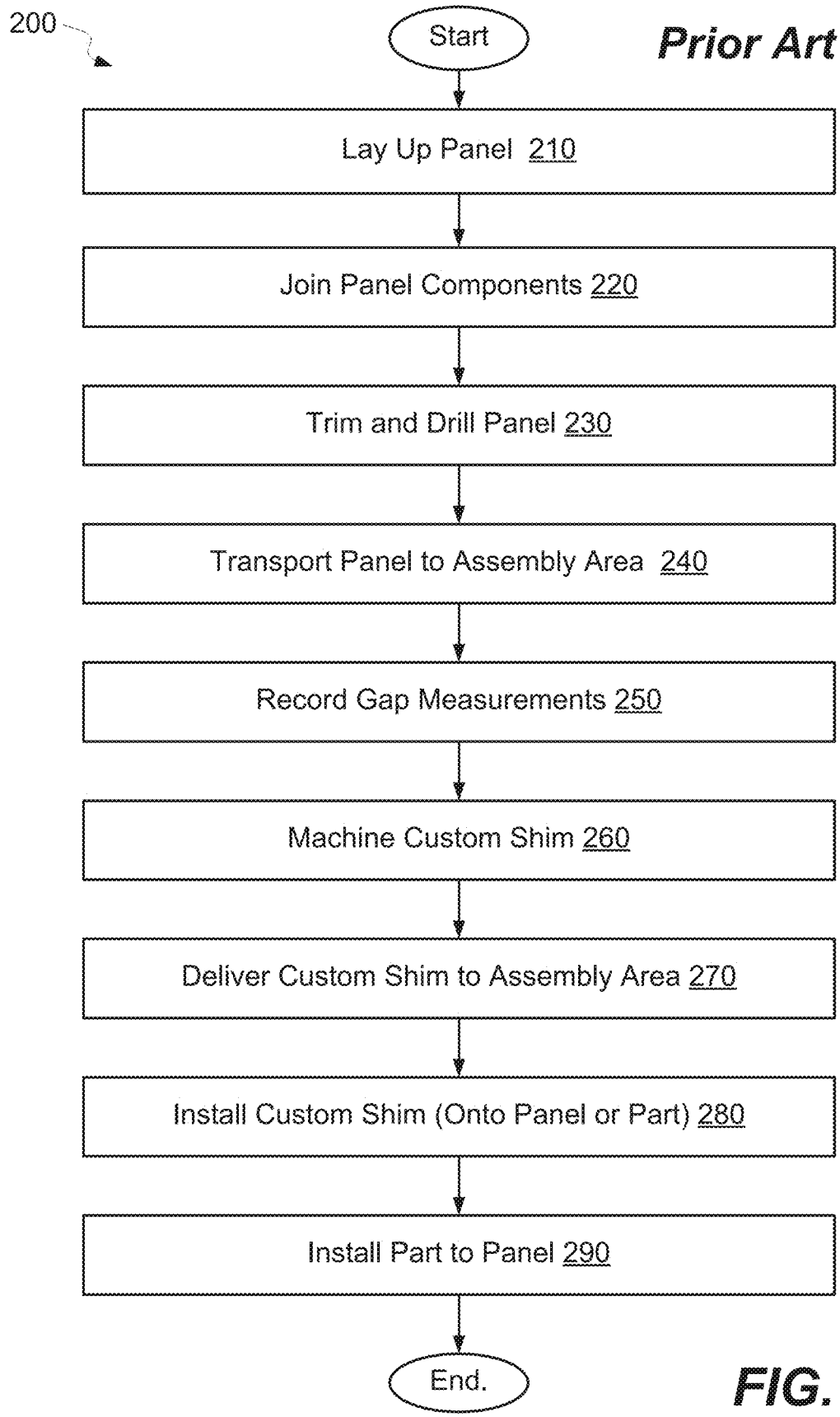
FIG. 2 illustrates an example of an existing process sequence for assembling a stiffened stringer panel.

FIG. 2 illustrates an example process sequence 200 of such existing assembly methods. At 210, a panel is laid up by positioning various components onto the skin member. As described with reference to FIG. 1C, a panel may include a skin member 110 with inner surface 110-A that is prepared and ready for stringers and other support tools (noodles, mandrels, etc.). In some examples, a plurality of panel plies may be laminated to form the skin member.

Stringers, such as stringer 120-A, and support tooling may then be positioned onto the inner surface of the skin member. Such support tooling may include cauls or other securing mechanisms.

At operation 220, the stringer is joined to the panel. The joining process may include vacuum bagging the components and support tooling with the panel, and curing the components and panel. In order for the pre-preg laminate to cure, it may be necessary to use a combination of pressure and heat. The skin member and the stringer may be co-cured or co-bonded. In some examples, the panel, including the assembly, may be placed within a vacuum bag for additional pressure to hold the composite layers in place for curing or bonding. Such panel assembly may be cured in an oven or autoclave at 350 degrees Fahrenheit at 90 PSI for several hours. Operations 210 and 220 may be implemented within a first cell or location of the assembly line.

After curing, the stringer is joined to the skin member, and the stiffened panel is debagged, trimmed, and drilled at operation 230 per engineering requirements. This may include drilling determinant assembly holes and other preparations for assembly. In some embodiments, the stiffened panel may be prepared for painting before being trimmed and drilled. These steps may be performed at a separate second cell or location of the assembly line.

At operation 240, the stiffened panel is transported to a third cell of the assembly line, referred to herein as the assembly area, where mechanics manually record gap measurements at operation 250. In some instances, the stiffened panel may include distortions once released from the support tooling after the joining process. Such distortions may be a product of chemical reactions and shrinkage during the curing or bonding process. This may cause irregular gaps between the stringer and interface surfaces of the stringer and internal supports structures.

The gap measurements may precisely determine gap distances between the panel and other parts to be joined to the panel, such as those shown in FIG. 1B, These measurements are then sent to the shim shop which is generally located in a separate location from the assembly area. At operation 260, a custom shim is machined at the shim shop according to the measurements. As previously described, the shim may be machined using a 5-axis machine to obtain the desired geometry based on the gap measurements.

The custom shim is then delivered to the assembly area at operation 270 and installed at operation 280. This can result in waits of up to 24 hours for a shim to be machined and delivered. The custom shim may then be installed onto the support structures, such as ribs or spars. However, in some embodiments, the custom shim may be installed onto portions of the panel, such as on the stringer at the assembly area. Finally, the parts (support structures) are installed to the panel at operation 290 at the assembly area. Such operations typically involve delays due to labor and time needed to measure gaps and machine custom shims at a separate location on expensive equipment. This reduces efficiency and increases costs.

Figure 3:
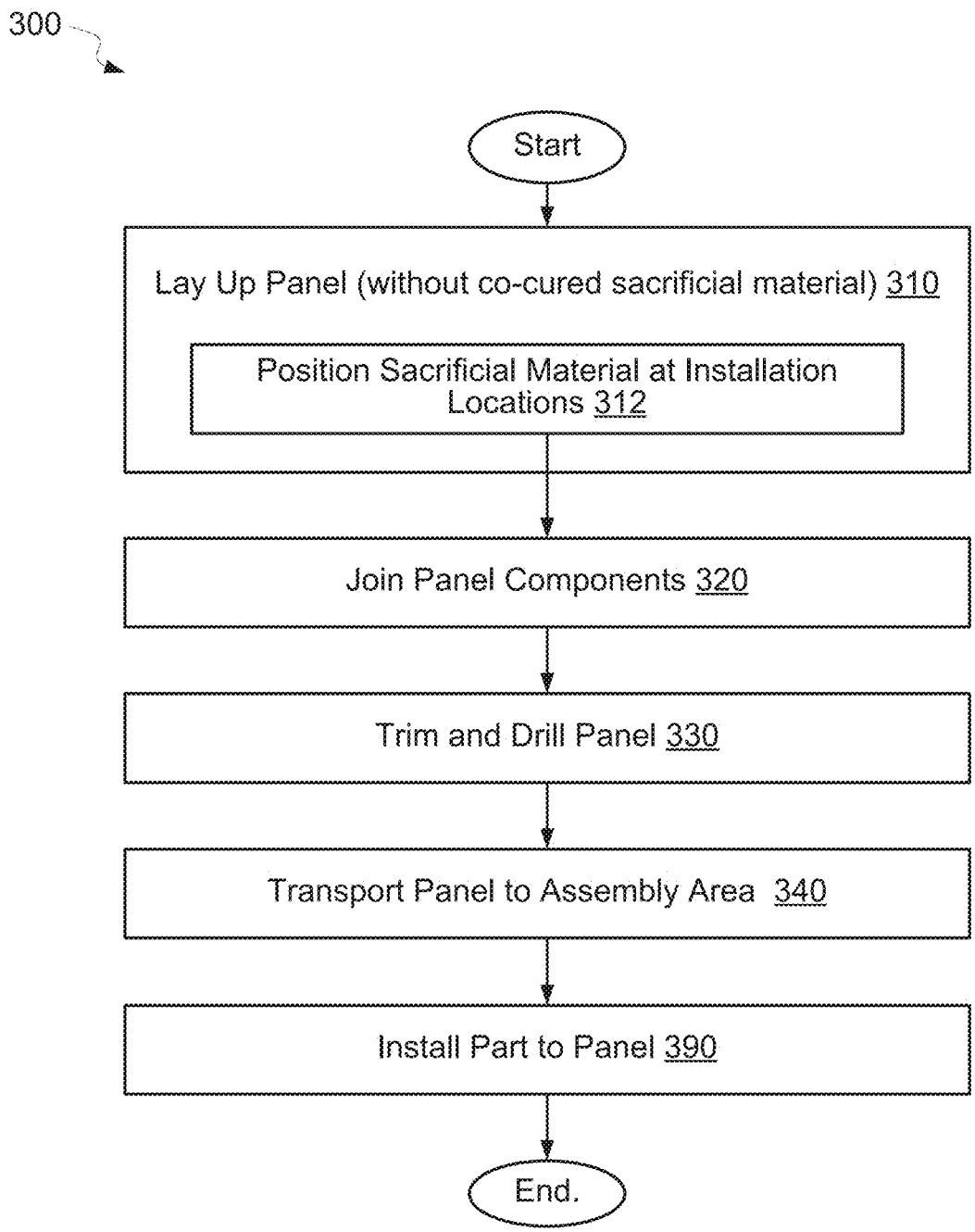
FIG. 3 illustrates an example process sequence for assembling a stiffened stringer panel, in accordance with one or more examples.
Figure 4A:
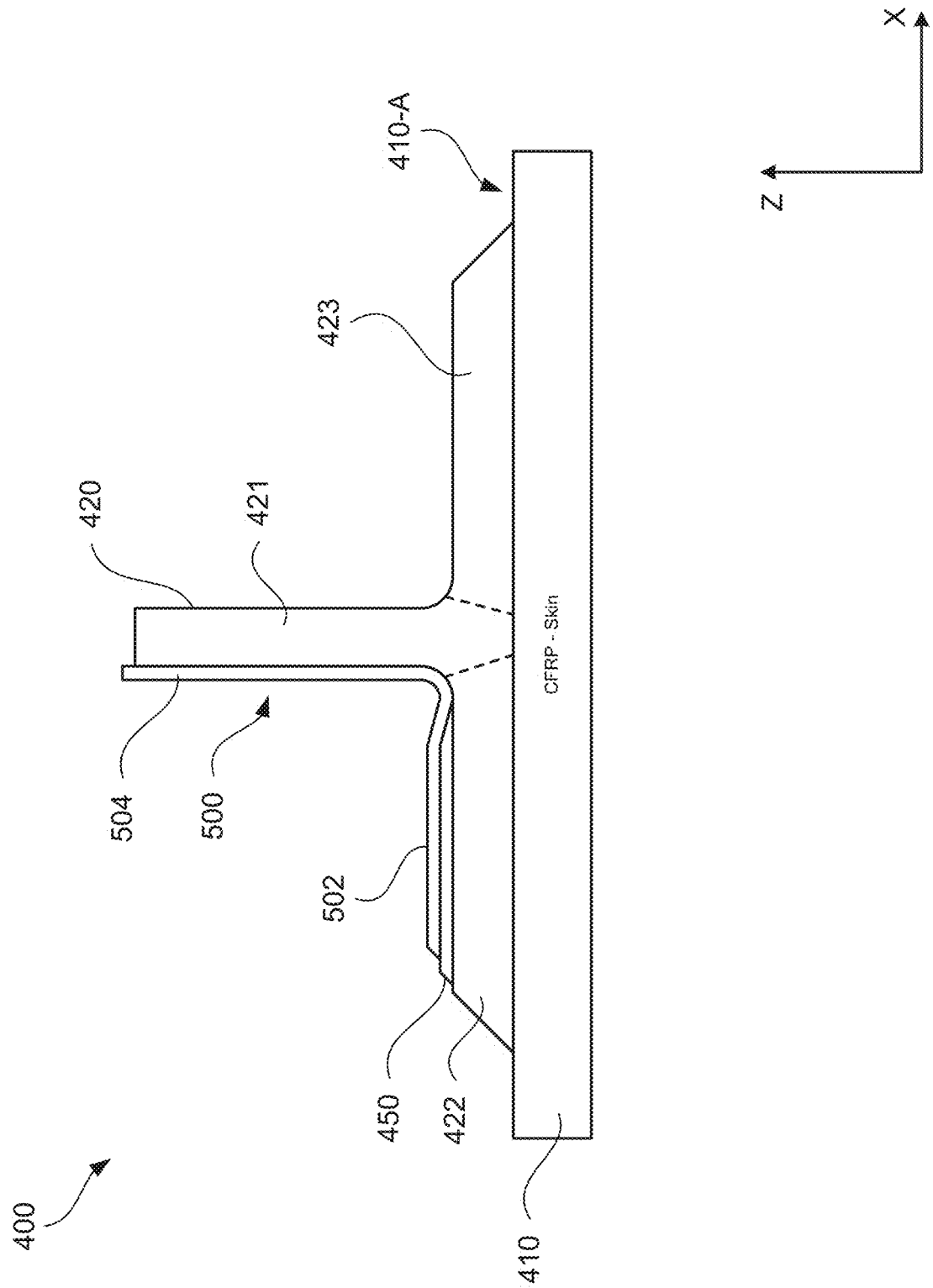
FIGS. 4A, 4B, and 4C illustrate cross-sectional views of a stiffened stringer panel with an integrated shim, in accordance with one or more examples.
Figure 4B:
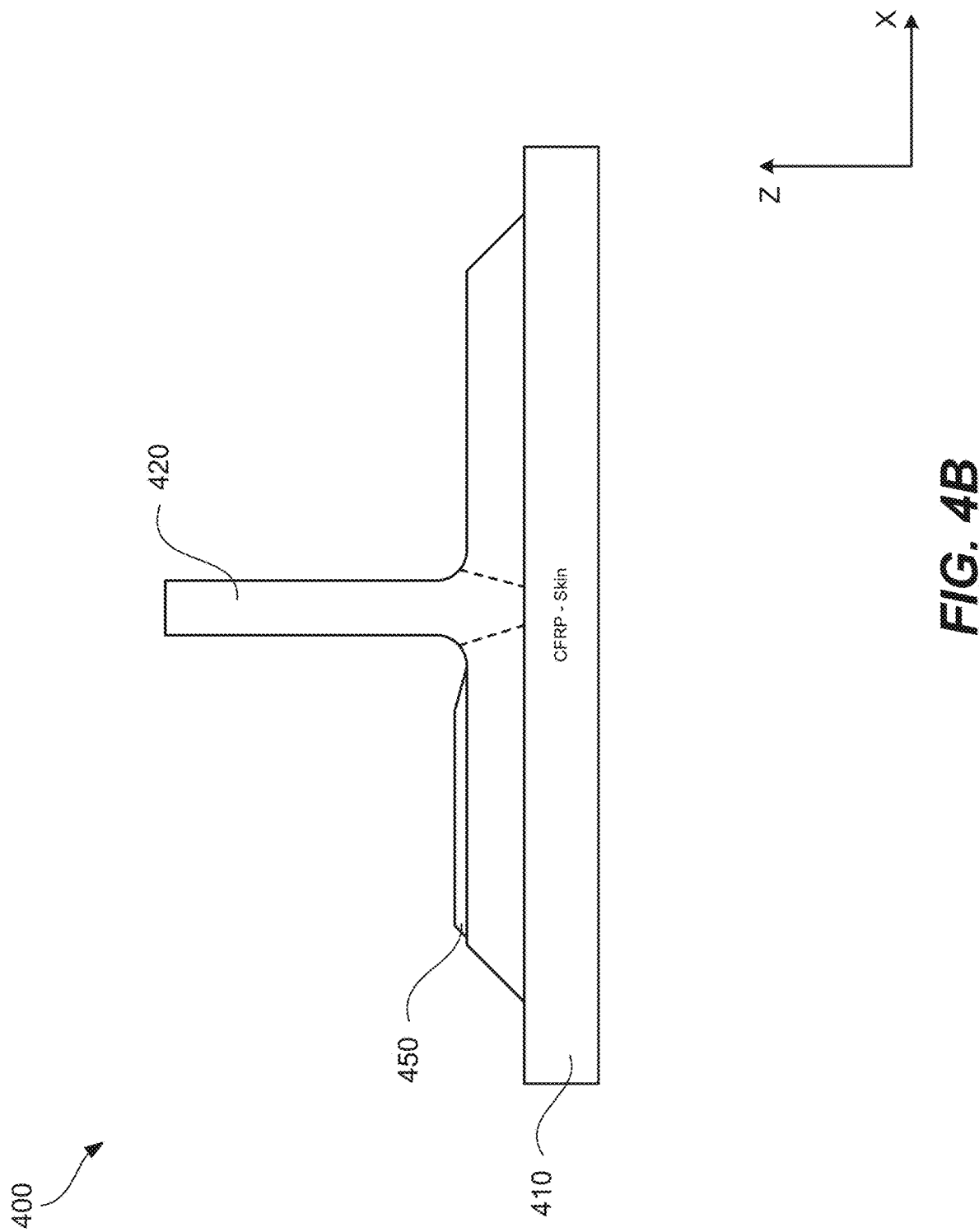
Figure 4C:
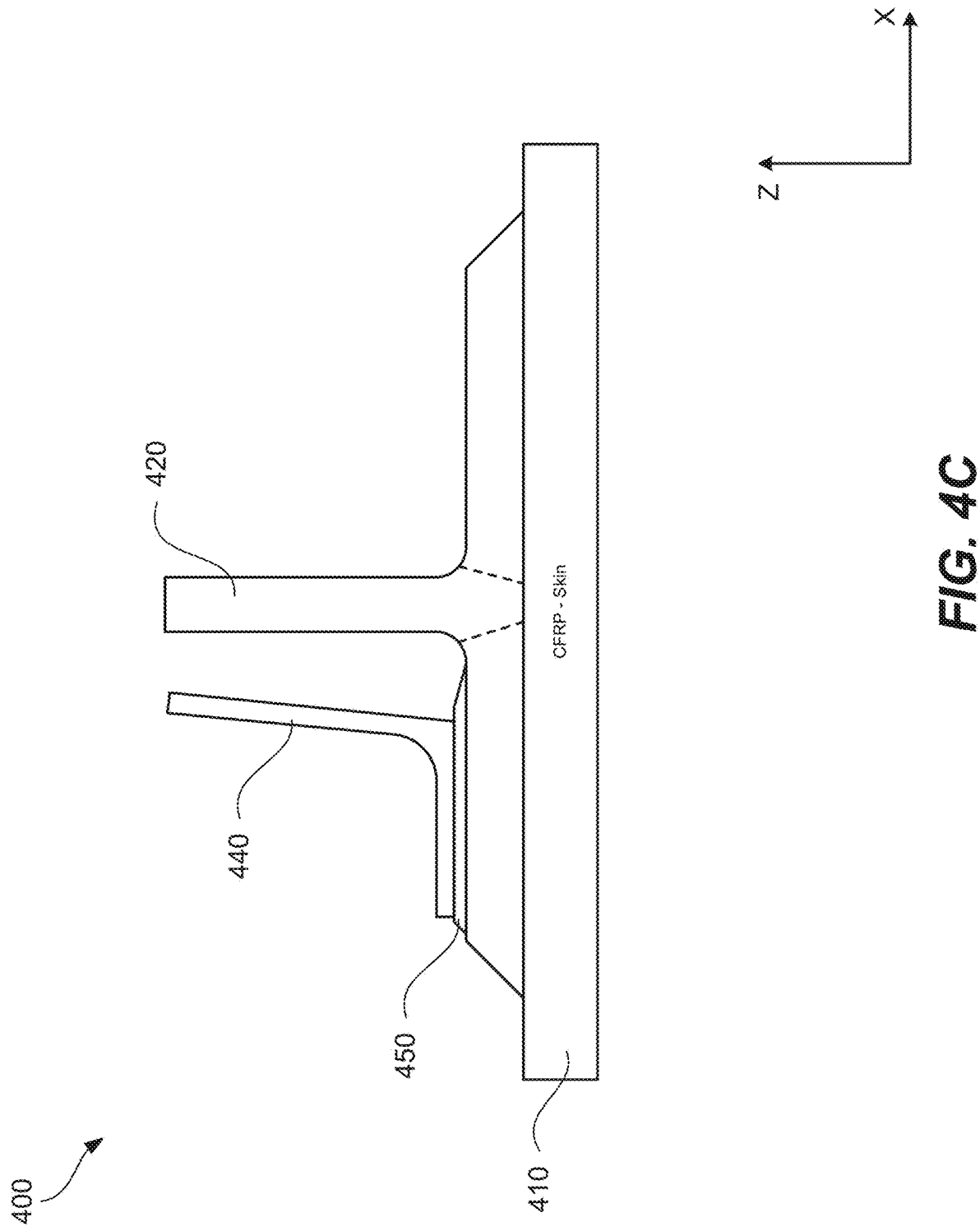

In contrast, the systems and methods described herein utilize an adjustable shim that is co-cured onto a stiffened panel. By incorporating an adjustable shim integrated directly on the wing panel, significantly reducing workflow and simplifying overall work statement, as well as decreasing manufacturing costs. FIG. 3 illustrates an example process sequence 300 for manufacturing a stiffened stringer panel, in accordance with one or more examples of the present disclosure. Several operations in process 300 correspond to operations within process 200, which will be referenced below. However, process 300 significantly simplifies and reduces labor in the overall assembly process as will be discussed. Process 300 will be discussed with reference to FIGS. 4A, 4B, and 4C. FIGS. 4A-4C illustrate cross-sectional views of a stiffened stringer panel 400 with an integrated shim at various stages of assembly, in accordance with one or more examples.

At operation 310, the panel is laid up with stringers and other support tooling. Operation 310 may correspond to operation 21.0 of process 200. As shown in FIG. 4A, panel 400 may include skin member 410 with stringer 420 positioned onto the inner surface 410-A during the lay-up process of 310. However, as previously described, stringer 420 may be positioned upon a base charge (stringer base) or other structure in some embodiments. Stringer 420 is shown as a T-shape or blade stringer with a central structure 421 extending into two flange portions 422 and 423 from the base of the central structure, which contacts the skin member.

At operation 312, sacrificial material that will form the integrated shim is positioned at installation locations on panel 400. Operation 312 may be an additional step performed during the panel lay-up operation 310. These installation locations are positions on the panel that will interface with other support structures, such as ribs and spars, during assembly. In some embodiments, an installation location may be located on the surface of the flange portion of stringer 420, opposite the skin member. As shown in FIG. 4A, shim 450 is positioned onto the surface of flange portion 422 of stringer 420. In some embodiments, the sacrificial material may be laid upon the other flange portion 323 as an integrated shim. Additional shims may be placed on other positions on the flange portions along the length of the stringer. In some embodiments, the sacrificial material is also placed on interface locations of interior surface 410-A of skin member 410.

Shim 450 may comprise any one of various sacrificial materials configured to be trimmed or shaped to fit precise measurements. Such materials may include fiberglass, such as pre-preg glass fiber reinforced plastic (GFRP) or carbon fiber reinforced plastic (CFRP) fabric. However, it should be recognized that any appropriate sacrificial material may be used for the integrated shims, including graphite or other metals and composites. In some embodiments, shim 450 may comprise multiple layers of laminated pre-preg fabric. Any number of layers may be included to provide the desired height (482) of shim 450. In some embodiments, the fibers within the pre-preg layers include the same orientation angle. For example, all fibers in each pre-preg layer may run in the spanwise direction or the chordwise direction. In some embodiments, the fibers may be positioned at an orientation angle in between the spanwise and chordwise directions. In some embodiments, the direction of fibers in adjacent pre-preg layers may be different.

Figure 4D:
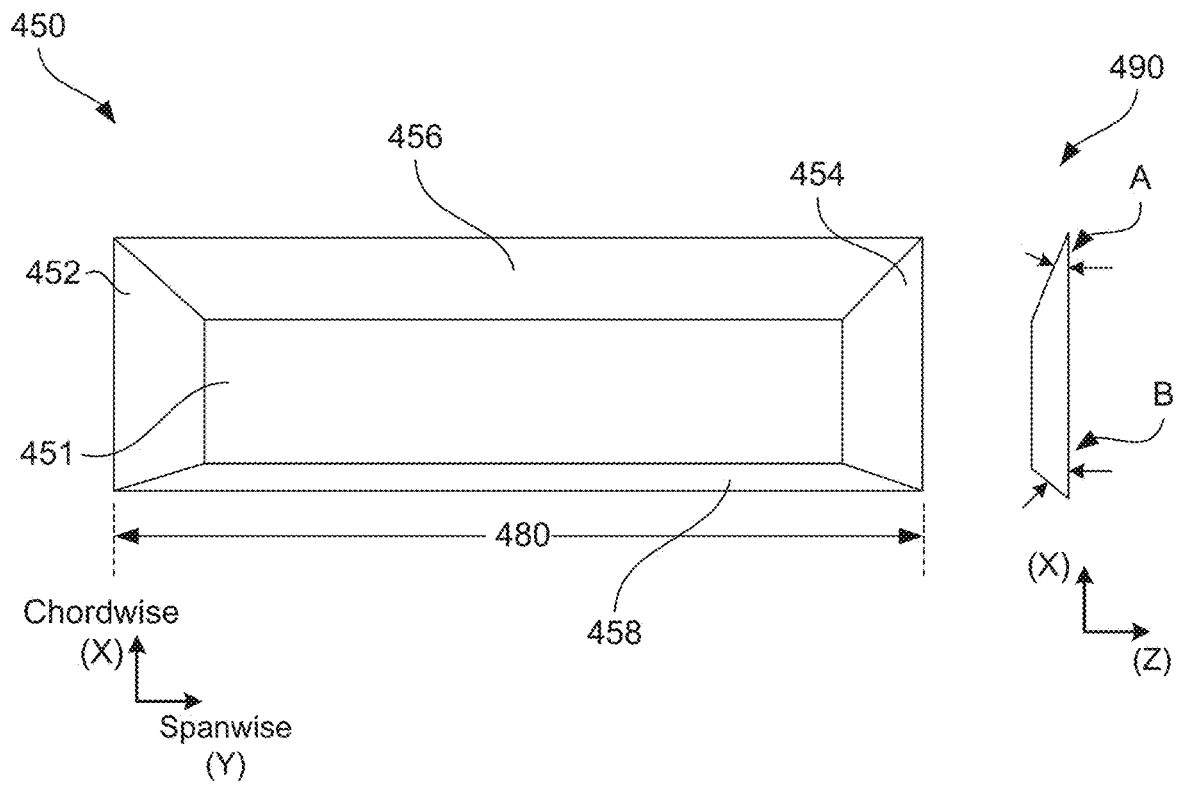
FIGS. 4D and 4E illustrate schematic views of an example integrated shim, in accordance with one or more examples.
Figure 4E:
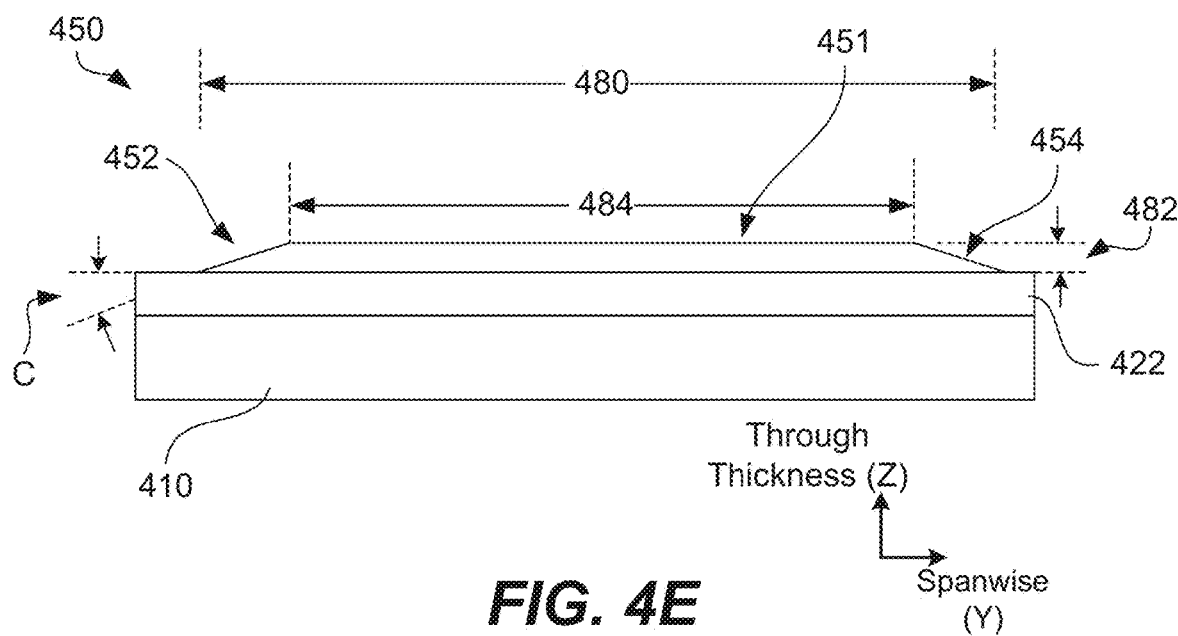

FIGS. 4D and 4E illustrate schematic views of an example integrated shim 450, in accordance with one or more examples, FIG. 4D shows a top-down view of shim 450, which includes an interface surface 451, lateral surfaces 452 and 454, a blade-side surface 456, and an external surface 458. FIG. 4D also shows a side view 490 of integrated shim 450. FIG. 4E shows a side cross-sectional view of integrated shim 450 after placement upon flange portion 422 of the blade stringer. An integrated shim may include a total spanwise length 480 and thickness 482. The interface surface may include a spanwise length 484. In an example embodiment, integrated shim 450 may include a total spanwise length of 4.25 inches, and the spanwise length of interface surface 451 may be approximately 3.50 inches. However, the spanwise lengths, as well as the chordwise lengths, of the integrated shim and the interface surface may vary in different embodiments. In an example embodiment, integrated shim 450 may include a thickness of approximately 1 inch. However, the thickness of the integrated shim may vary in different embodiments.

In various embodiments, the surfaces of the integrated shim may be sloped or tapered. For example, blade-side surface 456 may include a slope of angle A, external surface 458 may include a slope of angle B, and lateral surfaces 452 and 454 may include a slope of angle C. In some embodiments, these surfaces may be configured with shallow angles to avoid bow waves in the stringer or wrinkles at bondlines during the curing process. In an example embodiment, the blade-side surface 456 may include a 15-degree slope while the external surface 458 of the shim may include a 45-degree slope. In an example embodiment, lateral surfaces 452 and 454 may include 15-degree slopes. It would be understood by one of ordinary skill in the art that the integrated shim may be configured with various different geometries based on the desired positioning and usage on the stiffened panel.

As previously described, the lay-up process may further include positioning specially configured cauls and other securing mechanisms onto the laid-up components. As shown in FIG. 4A, caul 500 may be positioned upon shim 450 and against one side of the central structure of stringer 420. FIG. 5 illustrates an example caul structure 500 for supporting an integrated shim, in accordance with one or more examples.

In various embodiments, caul 500 may be constructed of a carbon fiber reinforced plastic. Caul 500 may include a sufficient length to contact one or more integrated shims placed on the panel. Caul 500 may include a horizontal base portion 502 and a vertical portion 504. In various embodiments, base portion 502 includes one or more recesses 510 which are configured to interface with each integrated shim positioned on the panel prior to curing. The recesses may be configured with a geometrical profile that corresponds to the surface geometry of at least blade-side surface 456, and lateral surfaces 452 and 454. However, in some embodiments, a recess may also be configured to contact external surface 458 of the integrated shim. As such, caul 500 may be specifically configured to interface with the geometrical profile of the integrated shim and of the surface of the stringer, and provide an evenly distributed pressure and surface against the structures during the curing and bonding process.

Process 300 may then proceed with operation 320 in which the stringer is joined to the panel, along with the integrated shim. Operation 320 may correspond to operation 220 of process 200. In some embodiments, the laid-up panel is vacuum bagged along with the caul for curing and bonding. The caul may further function to evenly distribute the vacuum pressure against the shim and stringer. In some embodiments, the integrated shim is co-cured with the stringer. However, in some embodiments, a pre-cured shim is co-bonded with the stringer during the joining process. After the joining process, the stiffened panel is debagged and support tooling, such as caul 500 may be removed from the panel. FIG. 4B shows panel 400 after the joining process with support tooling removed. As previously described, the above-mentioned operations may occur at the first cell of the assembly line.

The panel is then moved to the second cell of the assembly line to be debagged and prepped before being trimmed and drilled at operation 330 per engineering requirements. Operation 330 may correspond to operation 230 of process 200. As part of the trimming operation 330, the integrated shims may be trimmed in the second cell location. The stiffened panel may be placed onto a numerical control mill fixture (NCMF). Such mill fixture may comprise a platform with support headers onto which the stiffened panel is positioned. The stiffened panel may be positioned with the external surface facing the headers with the inner surface and stringer facing upwards. In some embodiments, each support header may correspond to the position of a rib structure, which may also correspond to the position of an integrated shim on the stiffened panel. This ensures adequate support during the trimming process as pressure is applied against the integrated shims. For example, each header may be spaced about two to three feet apart. Tighter and denser spacing of the headers may help prevent residual panel distortion in areas not contacting the headers. In some embodiments, the headers may be configured with vacuum ports that can suction the exterior of the surface panel against the headers to fix the panel in place and allow for more consistent and accurate measurement and tooling.

The mill fixture may be programmed to trim the stiffened panel at particular locations to engineering specifications. For example, there may be specific height or thickness requirements at or around the header support locations. The mill fixture may then trim and shape material from the integrated shims to meet these height or thickness requirements. The milling process may employ horizontal or vertical computer numerical control (CNC) enabled milling machines based on the specifications and requirements of the milling application, and rotating multi-point (i.e., multi-toothed) cutting tools, such as mills and drills.

In some embodiments, one or more operations of process 300 may be applied to the manufacture of ribs or spars to incorporate integrated shims onto such structures. For example, spar structures may be manufactured with integrated shim structures placed along an interface surface, such as interface surface 143. The integrated shims on these support structures may then be trimmed before assembly and installation.

Instead of recording gap measurements, sending the measurements to a shim shop to machine a custom shim, and delivering the custom shim back to the assembly area, the integrated shim may be directly trimmed at operation 330 after curing by trimming the sacrificial material of the integrated shim to fit the gaps. Once the stiffened panel has been precisely machined and prepared for assembly, the panel may then be transported to the assembly area (third cell location) at operation 340, as previously discussed with reference to operation 240 of process 200. The part may then be ready for installation to the panel at operation 390 at the assembly area, which may correspond to operation 290 of process 200. FIG. 4C shows stiffened panel 400 with rib 440 interfacing with integrated shim 450 on stringer 420.

As described, process 300 drastically reduces assembly time and labor by implementing the integrated shim as a constant interface surface, which eliminates many of the common problems of fit-up issues at part assembly. First, the flow of the assembly process is improved by eliminating the need to transport parts and measurements between different locations and wait time needed for custom-made shims. Operations 250, 260, 270, and 280 (which require precise measurements, machining at a separate location, transport of the custom shim, and installation of the shim as an additional part) are eliminated. Instead, the integrated shim is incorporated into the panel during the lay-up and joining processes. Furthermore, the integrated shim is precisely trimmed by numerical control mill fixtures at operation 330, reducing workload from manual measurements of gaps and installation of custom shims in confined spaces, such as a closed wing tank.

The use of integrated sacrificial shims offers additional improvements during assembly. The integrated shims of each stiffened panel are directly trimmed on the mill fixture according to the same engineering specifications without the need for measurements by hand. Furthermore, mechanics no longer need to take measurements of gaps or install custom shims in closed areas with limited space within structures such as a wing box. Thus, the use of the integrated shim reduces or eliminates assembly variability from part to part, producing repeatable high-quality results. Additionally, designed-in gaps may be eliminated causing part-to-part indexing to be more thorough. Variability may arise with designed gaps due to forces caused by gravity or tooling during measuring of the gap. Determinant assembly holes can also be pinned without drilling through an integrated shim. Seals may also be applied to faying surfaces without shims sliding around reducing fillet seals, and the integrated shims result in fewer faying surfaces as compared to the use of a custom shim between built-in gaps.

Aircraft Examples

Figure 6:
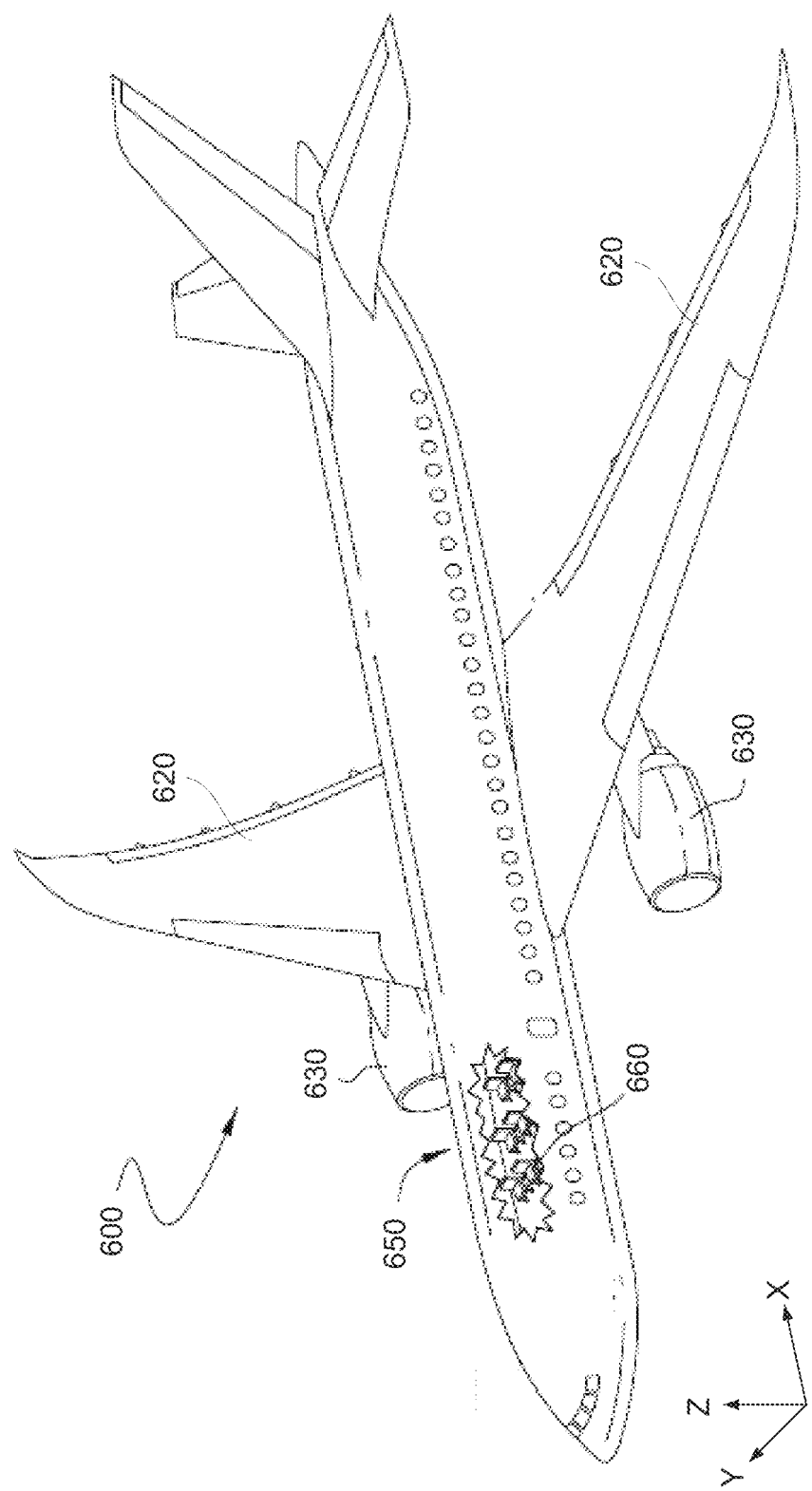
FIG. 6 is a schematic illustration of an aircraft that may include stiffened stringer panels as described herein, in accordance with one or more examples.
Figure 7:
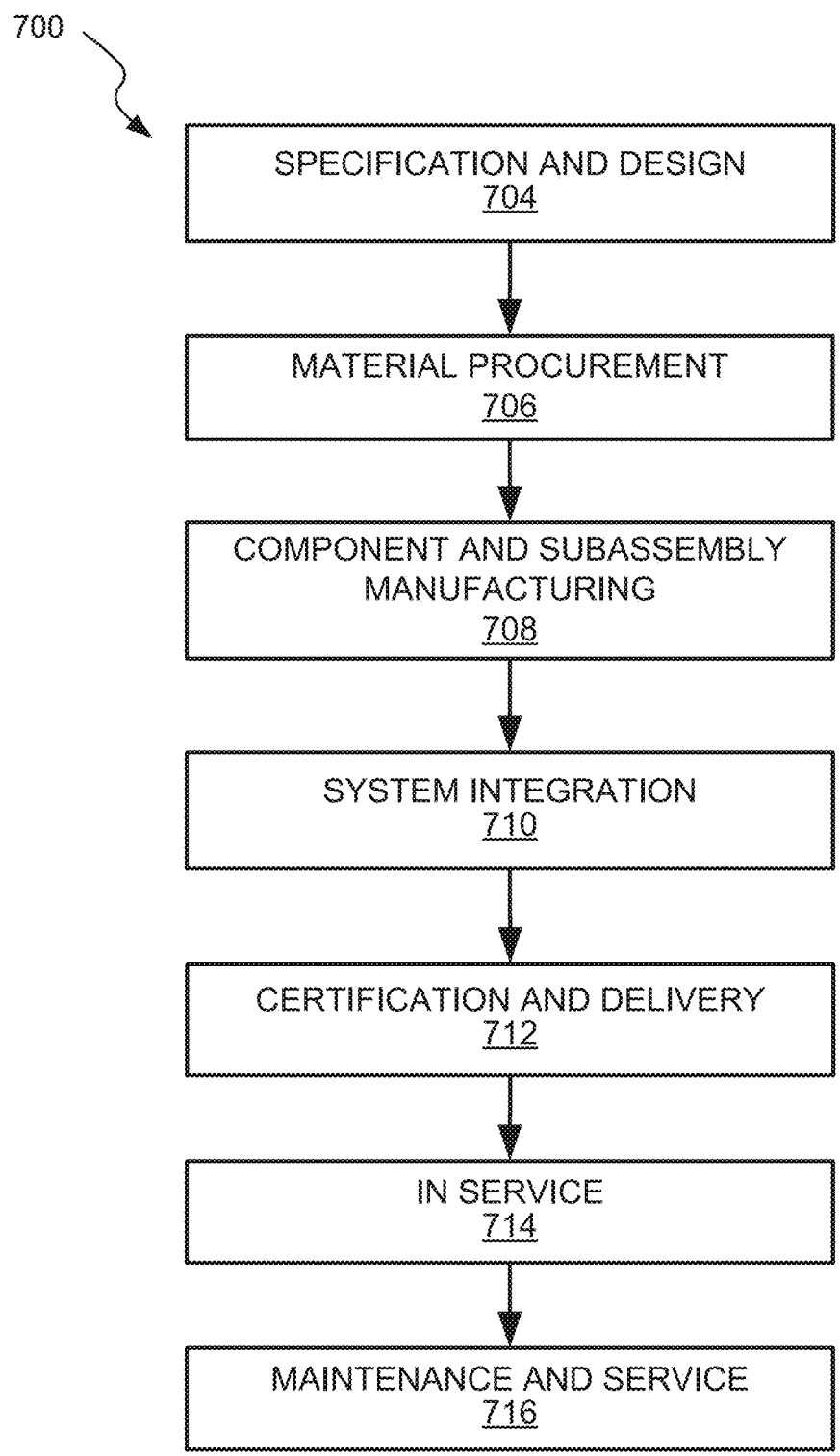
FIG. 7 is a block diagram of aircraft production and service methodology that may utilize methods and assemblies described herein.

Examples of the present disclosure may be described in the context of aircraft 600 as shown in FIG. 6 and aircraft manufacturing and service method 600 as shown in FIG. 7. FIG. 6 is a schematic illustration of an aircraft 600 that may comprise stiffened stringer panels as described herein, in accordance with one or more examples. As depicted in FIG. 6, aircraft 600 comprises airframe 650 with interior 660. Aircraft 600 includes wings 620 coupled to airframe 650. Aircraft 600 may also include engines 630 supported by wings 620. Aircraft 600 is one example of a vehicle in which the systems and methods described, such as stiffened stringer panel 400, may be implemented and operated, in accordance with an illustrative example. Although an aerospace example is shown, the principles disclosed herein may be applied to other industries, such as the automotive industry. Accordingly, in addition to aircraft 600, the principles disclosed herein may apply to other vehicles, e.g., land vehicles, marine vehicles, space vehicles, etc.

FIG. 7 is a block diagram of aircraft production and service methodology that may utilize methods and assemblies described herein. During pre-production, illustrative method 700 may include specification and design (block 704) of aircraft 600 and material procurement (block 706). During production, component and subassembly manufacturing (block 708) and inspection system integration (block 710) of aircraft 600 may take place. Described apparatus, and corresponding methods of operation, may be implemented in any of specification and design (block 704) of aircraft 600, material procurement (block 706), component and subassembly manufacturing (block 708), and/or inspection system integration (block 710) of aircraft 600.

Thereafter, aircraft 600 may go through certification and delivery (block 712) to be placed in service (block 714). While in service, aircraft 600 may be scheduled for routine maintenance and service (block 716). Routine maintenance and service may include modification, reconfiguration, refurbishment, etc. of one or more inspection systems of aircraft 600. Described apparatus, and corresponding methods of operation, may be implemented in any of certification and delivery (block 712), service (block 714), and/or routine maintenance and service (block 716).

Each of the processes of illustrative method 700 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Conclusion

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure.

While the present disclosure has been particularly shown and described with reference to specific examples thereof, it will be understood by those skilled in the art that changes in the form and details of the disclosed examples may be made without departing from the spirit or scope of the present disclosure. It is therefore intended that the present disclosure be interpreted to include all variations and equivalents that fall within the true spirit and scope of the present disclosure. Accordingly, the present examples are to be considered illustrative and not restrictive.

Although many of the components and processes are described above in the singular for convenience, it will be appreciated by one of skill in the art that multiple components and repeated processes can also be used to practice the techniques of the present disclosure.

What is claimed is:

1. A method comprising:
   providing a skin member having an inner surface;
   positioning a stringer onto the inner surface of the skin member, the stringer comprising a first flange portion and a second flange portion, the first flange portion and the second flange portion contacting the inner surface;
   positioning an integrated shim on the first flange portion;
   joining the integrated shim, the stringer, and the skin member; and
   after the joining step, trimming the integrated shim to fit a gap, wherein the gap is between a surface of the stringer and a surface of another part that is to be joined with the stringer.

2. The method of claim 1, wherein the integrated shim comprises a sacrificial material configured to be trimmed to a desired geometry.

3. The method of claim 2, wherein the sacrificial material comprises a glass fiber reinforced plastic fabric pre-impregnated with resin.

4. The method of claim 3, wherein the integrated shim comprises a plurality of laminated layers of the glass fiber reinforced plastic fabric.

5. The method of claim 4, wherein composite fibers of adjacent laminate layers have a same orientation angle.

6. The composite panel of claim 1, wherein the integrated shim is configured to interface with an internal support structure of a wing assembly.

7. The method of claim 1, further comprising:
   installing the stiffened composite panel to a wing assembly, wherein the integrated shim interfaces with the surface of an internal support structure of the wing assembly.

8. The method of claim 1, wherein the stringer is a blade stringer comprising a central blade structure extending into the first flange portion and the second flange portion from a base of the central structure.

9. The method of claim 1, wherein the integrated shim, the stringer, and the skin member are joined by co-curing or co-bonding, the method further comprising:
   prior to joining, positioning a caul on at least one side of the integrated shim and a surface of the stringer to secure the integrated shim onto the stringer during a joining operation; and
   removing the caul after the integrated shim, the stringer, and the skin member are joined.

* * * * *